United States Patent

Hayward

[11] 4,282,859
[45] Aug. 11, 1981

[54] SOLAR HEATER

[76] Inventor: Norman G. Hayward, 11720 Moffitt La., Manasses, Va. 22110

[21] Appl. No.: 97,684

[22] Filed: Nov. 27, 1979

[51] Int. Cl.³ .............................................. F24J 3/02
[52] U.S. Cl. .................................... 126/428; 126/432
[58] Field of Search ............................. 126/428–432, 126/449, 450

[56] References Cited

U.S. PATENT DOCUMENTS 2,529,621  11/1950  Mayo .................................... 126/428
3,949,732  4/1976  Reines .................................. 126/429
4,084,573  4/1978  Shubert ................................ 126/429
4,141,337  2/1979  Bergen ................................. 126/429

Primary Examiner—James C. Teung
Attorney, Agent, or Firm—James H. Littlepage

[57] ABSTRACT

A pair of generally conical heat-collector surfaces, one spaced above the other, are mounted over a plenum chamber. Helical baffles define tortuous passages between the cones. Air to be heated is drawn downwardly between the cones into the plenum chamber.

4 Claims, 2 Drawing Figures

SOLAR HEATER

FIELD OF INVENTION

Stoves and Furnaces, Heaters, Solar.

OBJECTS

The primary object of this invention is to provide a solar heater for air, wherein the air to be heated is drawn downwardly through a space along the underside of a generally conical surface, which surface is exposed to the sun. A feature of the invention is it is a solar heater for air which is non-directional, thereby providing maximum solar heating, regardless of the apparent position of the sun, and regardless of wind direction, even though the heater is stationary and contains no moving parts.

Still another object is to provide for a maximal wiping of the air along a solar heated surface while simultaneously providing extensions of the solar heated surface.

These and other objects will be apparent from the following specification and drawings in which.

Figures 1, 2:
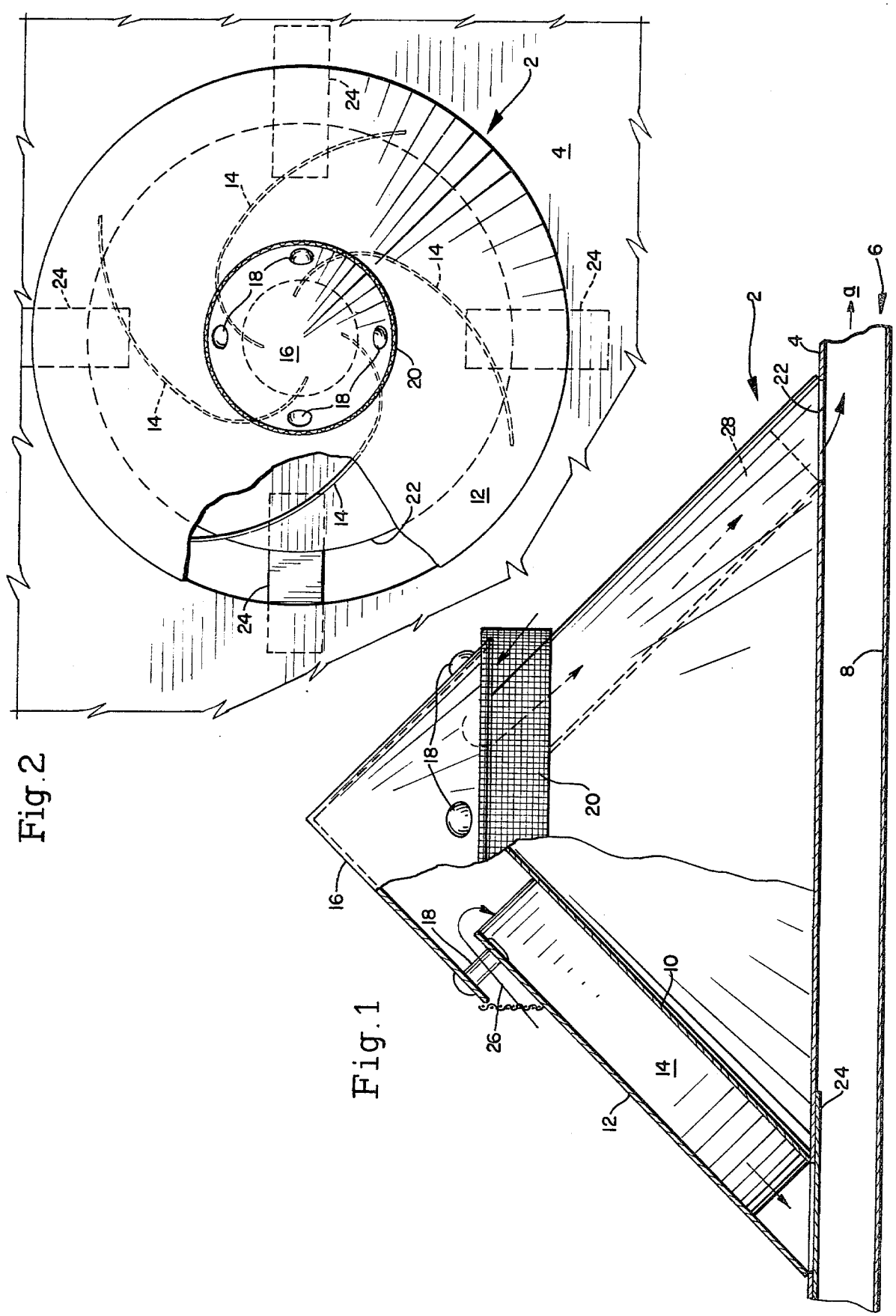
FIG. 1 is a side elevation, broken away to show inner elements in cross section, of the solar air heater.
FIG. 2 is a plan view of the solar heater shown in FIG. 1.

Referring now to the drawing, in which like reference numerals denote similar elements, the solar air heater 2 is supported on the upper wall 4 of a plenum chamber 6 through which air is drawn as indicated by the arrow a. The plenum chamber has a lower wall 8 spaced below the upper wall 6.

Supported on the upper wall 4 of the plenum chamber is a cone 10 which may be formed of suitable material, such as metal, and whose outer surface may be shiny to provide good heat reflection. Spaced outwardly of the cone 10 is a frusto-cone 12, whose outer surface should be black, and between the cones are a series of helical baffles 14. The baffles 14 are preferably in good heat-conducting contact against the underside of the frusto-cone 12. Spaced above both cones is a conical cap 16 whose surface should also be black. It is supported by suitable posts 18. A screen 20 disposed between cap 16 and frusto-cone 12 prevents egress of unwanted insects, animals or leaves. A generally annular port 22 in the upper wall 4 of plenum chamber 6 is bridged by angularly spaced strips 24, it being apparent that the helical spaces 28 between the helical baffles 14 lead through port 22 into the plenum chamber 6. Air enters these helical spaces 28 through the space 26 between the lower edge of cap 16 and the upper surface of frusto-cone 12.

In operation, a conventional pump or fan (not shown) draws a slight suction so as to draw air in through port 22, as indicated by the arrow a. The sun's rays impinge upon the outer surface of frusto-cone 12 and heat is imparted thereto. Air wipes against the outer surface of frusto-cone 12 and is heated thereby, the air moving up along the outer surface of the frusto-cone and then being drawn in through screen 20 and the space 26 into the space below cap 16, and thence downwardly through the helical spaces 22 between helical baffles 14. The air is thus drawn through a tortuous path so that it wipes against a large portion of the underside of the frusto-cone and against the helical baffles which are in heat-transfer contact therewith. Heat impinging upon the outer surface of the inner cone 10 is reflected back into the downwardly and helically moving air streams. The heated air drawn through port 22 into the plenum chamber 6 is drawn to a suitable heat utilizing or storage device.

While only one solar heating unit has been illustrated, it will be understood that many such units would normally to supported on a plenum chamber. It should also be understood that the plenum chamber walls may be curved or the top wall of the chamber may be a pitched roof or it may be conical.

I claim:

1. A solar heater for air, comprising: a chamber,
   first means providing a first downwardly-enlarged generally conical surface disposed above the chamber,
   second means providing a second downwardly-enlarged generally conical surface spaced outwardly from the first generally conical surface,
   said first and second means providing a space between said surfaces which is substantially open at the top and bottom, the open top of said space being open to the atmosphere and providing an air inlet thereto,
   port means for connecting of the bottom of said space to said chamber, and
   means for drawing air through said air inlet into said space between said surface and thence through said port means into said chamber.

2. A solar heater as claimed in claim 1, and baffle means disposed in said space for providing a tortuous characteristic to the space between said conical surfaces.

3. A solar heater as claimed in claim 2, said baffle means being substantially helical.

4. A solar heater as claimed in claim 3, said baffle means being in good heat-transfer contact with the said second means, and said second means being of relatively good heat-conducting material.

* * * * *